US007028798B2

(12) United States Patent
Castellon

(10) Patent No.: US 7,028,798 B2
(45) Date of Patent: Apr. 18, 2006

(54) DEVICE FOR OPENING THE BONNET OF A MOTOR VEHICLE

(76) Inventor: Melchor D. Castellon, Diputacion, 455-457, E-08013 Barcelona (ES)

( * ) Notice: Subject to any disclaimer, the term of this patent is extended or adjusted under 35 U.S.C. 154(b) by 203 days.

(21) Appl. No.: 10/689,949

(22) Filed: Oct. 22, 2003

(65) Prior Publication Data

US 2004/0083775 A1 May 6, 2004

(30) Foreign Application Priority Data

Nov. 5, 2002 (ES) ................................ 200202532

(51) Int. Cl.
*B62D 25/12* (2006.01)

(52) U.S. Cl. .................. 180/69.21; 180/69.2; 292/126; 292/DIG. 14

(58) Field of Classification Search ............... 180/69.2, 180/69.21, 69.22; 292/121, 122, 123, 126, 292/336.3, 341.15, DIG. 4, DIG. 14
See application file for complete search history.

(56) References Cited

U.S. PATENT DOCUMENTS 4,070,050 A * 1/1978 Glock et al. ................ 292/339
4,938,520 A * 7/1990 Shelton ........................ 296/76
5,306,053 A * 4/1994 Gurusami et al. .......... 292/278
5,361,612 A * 11/1994 Voiculescu et al. ........... 70/241
5,975,228 A * 11/1999 Parfitt ...................... 180/69.21
6,361,091 B1 * 3/2002 Weschler ................. 292/336.3
6,394,211 B1 * 5/2002 Palenchar et al. ....... 180/69.21
6,575,503 B1 * 6/2003 Johansson et al. .......... 292/170
6,588,525 B1 * 7/2003 Brogly et al. ............ 180/69.21
6,742,819 B1 * 6/2004 So et al. ..................... 292/225

* cited by examiner

*Primary Examiner*—Jeff Restifo
(74) *Attorney, Agent, or Firm*—Dickstein, Shapiro, Morin & Oshinsky, LLP.

(57) ABSTRACT

It comprises a rear part provided with a cylindrical body surrounding and clamping a sheath for receiving and protecting a driving cable. There is provided a lock for retaining the sheath at the opposite end thereof helped by a dust-coat. Rotation of the rear part makes said lock to be released through a spear. The sheath is provided with a cover inside of which a stranded wire bundle is disposed wherein a metal coil is arranged. Disassembling of the device is made by rotating the hood of the rear part and releasing the spear from the lock. There are also provided projections extending from the spear which may be transversely moved and either transversely compressed or expanded but never being released from the lock as the cable is rotated.

7 Claims, 3 Drawing Sheets

DEVICE FOR OPENING THE BONNET OF A MOTOR VEHICLE

FIELD OF THE INVENTION

The present patent application relates, as stated in its title, to a "DEVICE FOR OPENING THE BONNET OF A MOTOR VEHICLE" which novel manufacturing, conformation and design features fulfil the purpose to which it has been specifically conceived, with a maximum safety and effectiveness.

BACKGROUND OF THE INVENTION

There exist in the market, and therefore they may be considered as state of the art, devices intended for locking and releasing a latching secured by any type of conventional means to the bonnet of the motor vehicle covering the motor opening. Said device has two purposes: on one hand it should prevent the bonnet from being opened by any cause and being raised by the force of the air obstructing the driver's forward vision with a consequent risk; and, on the other hand, to prevent the motor bonnet from being opened thereby permitting the stealing of parts of the car located inside the motor opening.

Typically, said latching is released by the action of a cable, one end of which is provided with a handle located inside the motor vehicle, whilst the opposed end is provided with a lever that retains the corresponding latching secured to the motor vehicle bonnet. This arrangement corresponds to a large amount of conventional devices acting in such a way that the user located inside the motor vehicle exerts a force on the handle and the cable on which it is secured by moving the lever and releasing said latching.

This type of device has the disadvantage that they may be easily violated for the purpose of stealing parts from the inside of the motor opening. It can be defeated by cutting the cable that joins the handle to the latching and releasing the latching to open the motor vehicle bonnet.

BRIEF SUMMARY OF THE INVENTION

The present invention seeks to overcome this disadvantage in such a way that any actions on the device result in the locking thereof through the means that are herein explained.

The device of the invention essentially comprises a rear part or locking member provided with a bell associated with a rear portion (lock body) of the bonnet and in the vicinity of the motor vehicle front grid. Such locking member and the lock body are associated with each other by means of a sheath inside of which a driving cable is arranged.

Inside the locking member, a cable terminal joining said locking member to an inner portion part of the lock body is provided. The sheath of the cable is flexible and it is inwardly overlapped to the locking member and the sheath terminal, said sheath being partially protected in the vicinity of the locking member by a flap and in the lock body by means of a dust-coat.

Inside the lock body, there is provided a spear, the front portion of which is fitted into the bonnet lock, while the rear portion thereof is snap fitted to the shaft terminal and this, in turn, to a ring.

The device has been designed in such a way that unwanted manipulation thereof, either by rotation of the sheath or the bell thereof, results in releasing of the spear from the interior of the shaft terminal. Thus, the spear remains inside the lock and the device is released from the cable. Therefore, if a thief gains access to the inner part of the bonnet, there will be no possibility to open up the bonnet from the interior when trying to manipulate the handle as the spear has been thus separated from the cable.

The features and the advantages of the device for opening the bonnet of a motor vehicle of the present invention will be apparent from the detailed description of a preferred embodiment thereof that will be given hereinafter by way of a non limiting example, with reference to the drawings herein enclosed, wherein:

DETAILED DESCRIPTION OF THE INVENTION

Figure 1:
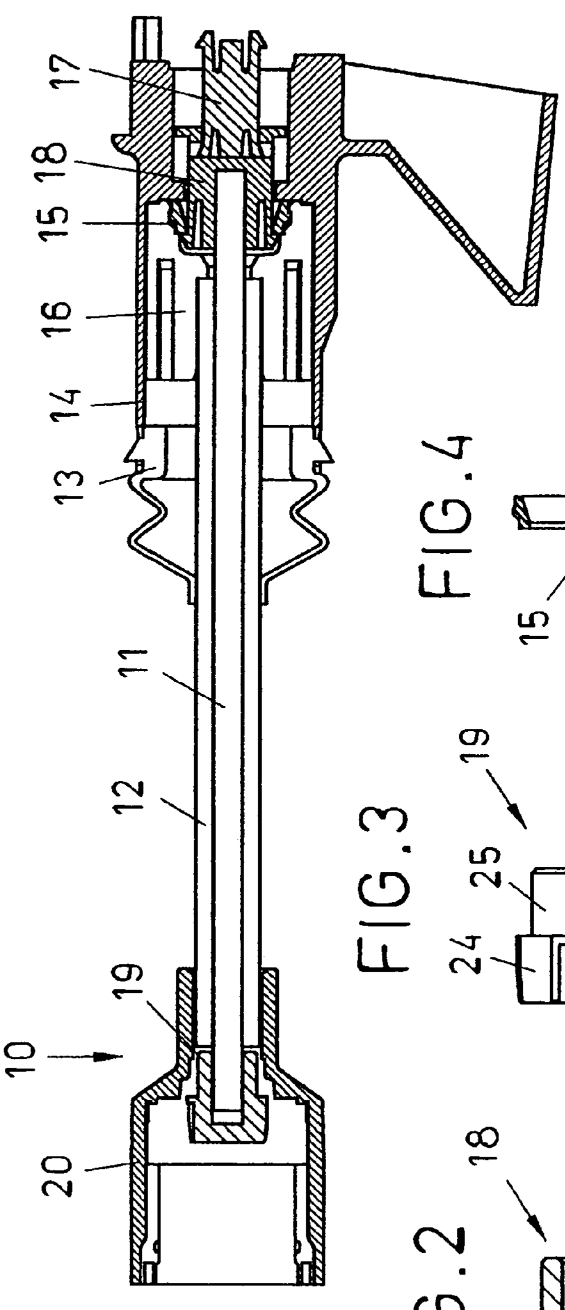
FIG. 1 is a longitudinal cross-sectional view of an embodiment of the device of the invention.
Figure 2:
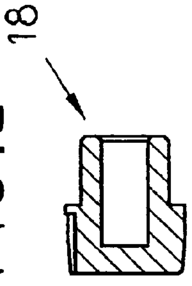
FIG. 2 is a side elevational view of the shaft terminal cut lengthwise by plane AA' in FIG. 3.
Figure 3:
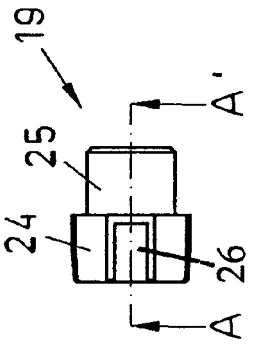
FIG. 3 is a front elevational view of the shaft terminal.
Figure 4:
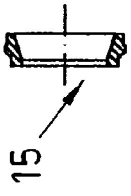
FIG. 4 is a cross section of the ring.
Figure 5:
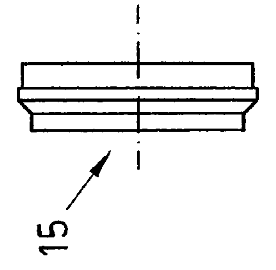
FIG. 5 is a side elevational view of the ring.
Figure 6:
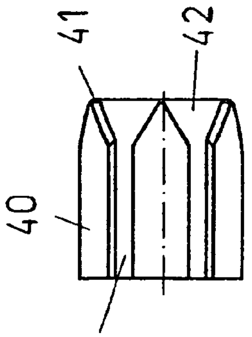
FIG. 6 is a side elevational view of the sheath terminal.
Figure 7:
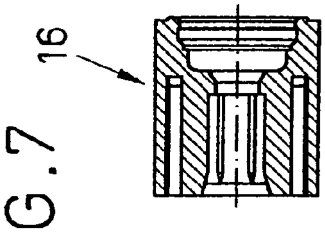
FIG. 7 is a longitudinal cross sectional view of the sheath terminal.
Figure 8:
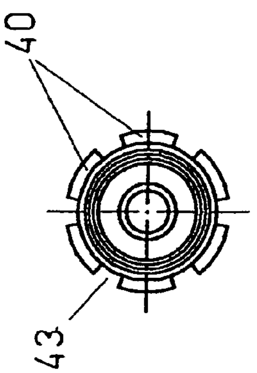
FIG. 8 is a front elevational view of the sheath terminal.

The various reference numerals which have been used herein to describe the preferred embodiment of the device of the present invention are given below:

(10) device;
(11) cable;
(12) sheath;
(13) dust-coat;
(14) lock body;
(15) ring;
(16) sheath terminal;
(17) spear;
(18) cable terminal;
(19) shaft terminal;
(20) locking member;
(22) cylindrical body;
(23) frusto conical body;
(24) cylindrical body;
(25) cylindrical body;
(26) cylindrical hole;
(27) cover;
(28) braided cables;
(29) metal loop;
(31) rear cylindrical neck of the dust-coat;
(32) front cylindrical neck of the dust-coat;

(33) lock flap;
(34, 35) spears;
(37) body;
(38) circular recess;
(40) grooves;
(41) peaks;
(42) valleys;
(43) longitudinal recesses;
(44) peaks;
(45) valleys;
(46) cylindrical body;
(47) holes in the cable terminal;
(48) circular extension;
(49) cavity;
(50) flap; and
(51) circular recess.

Figure 10:
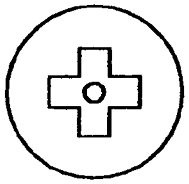
FIG. 10 is a front elevational view of the cable terminal.
Figure 11:
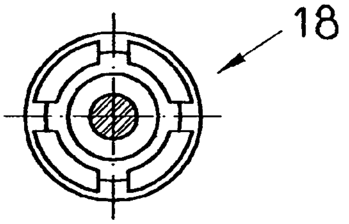
FIG. 11 is a rear elevational view of the cable terminal.
Figure 18:
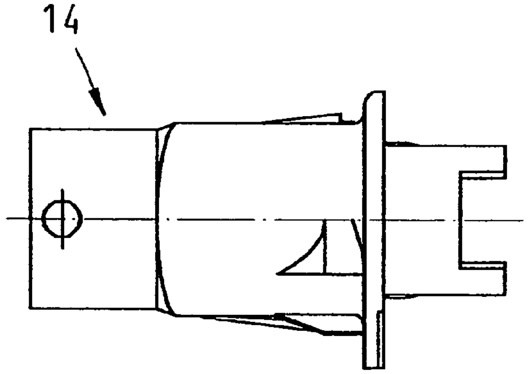
FIG. 18 a side elevational view of the lock body.
Figure 19:
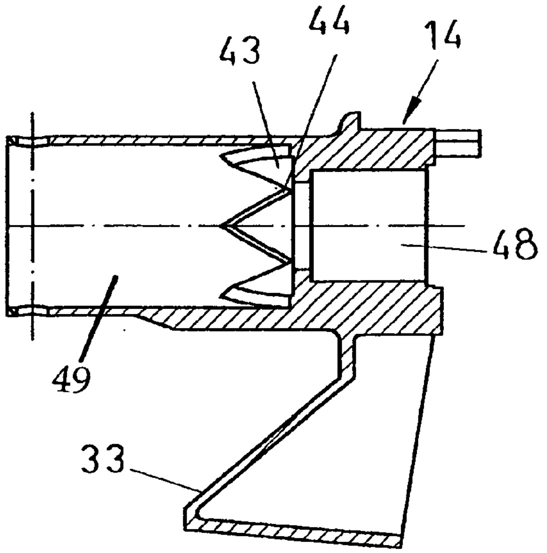
FIG. 19 is a longitudinal cross sectional view of the lock body.

In one of the preferred embodiments of the present invention and as shown in FIG. 1, the device (10) comprises a locking member (20) associated with the lock body (14)—see FIGS. 18 and 19—through a sheath (12) and a driving cable (11) shown in FIGS. 10 and 11.

Figure 14:
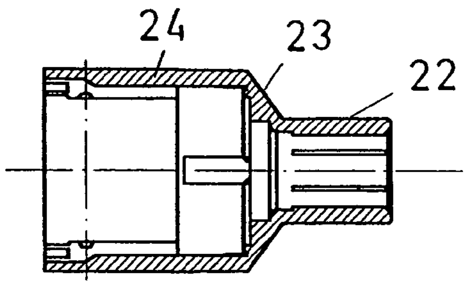
FIG. 14 is a longitudinal cross sectional view of the locking member.
Figure 15:
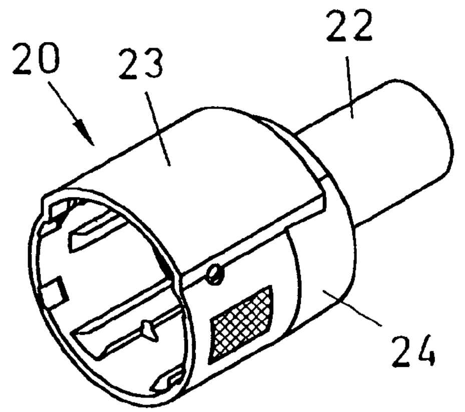
FIG. 15 is a perspective view of the locking member bell.
Figure 16:
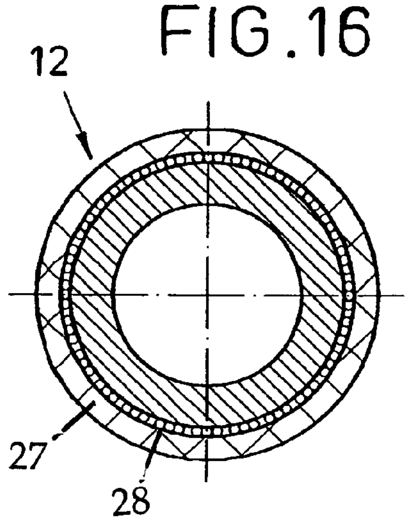
FIG. 16 is a front elevational view of the sheath transversely cut by plane BB' in FIG. 17.
Figure 17:
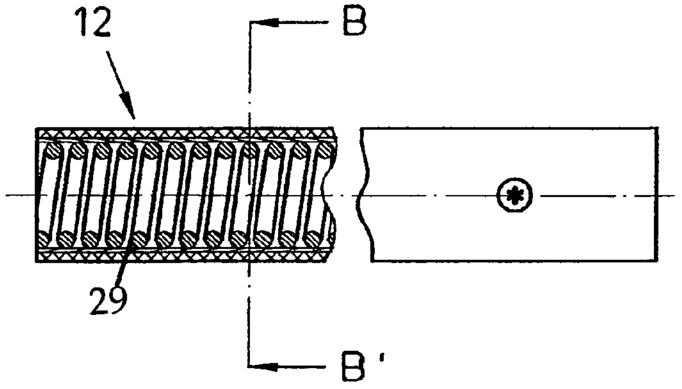
FIG. 17 is a side elevational view of the sheath.

Said locking member (20)—as seen in FIG. 14—comprises a cylindrical body (22) surrounding said sheath (12), extending into a body (23) having a frusto conical configuration which, in turn, extends into a further cylindrical body of a greater diameter than said cylindrical body (22) inside of which the shaft terminal (19) surrounding the cable (11) is provided. The shaft terminal (19) is provided with a slightly cylindrical body (24) extending into a further cylindrical body of smaller diameter (25) inside of which it is provided with a cylindrical dead hole (26) that surrounds and traps the cable (11) of the device (10).

The sheath (12) joins the locking member (20) to the lock body (14) by means of a cover (27) inside of which braided wires (28) are arranged. Said braided wires (28) are 0.30 mm approximately in diameter and a metal loop (29) is disposed therein serving the purpose of transmitting the torque without losing longitudinal flexibility.

Figure 12:
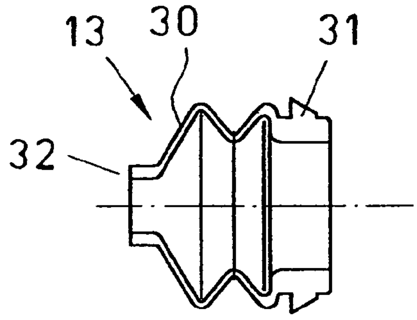
FIG. 12 is a side elevational view of the dustcoat.

The sheath (12) penetrates into the lock body (14) at the end opposite to that of the locking member (20) helped and protected by means of a dust-coat (13) which details may be seen in FIG. 12. Said dust-coat (13) is formed of bellows (30) made of elastic material (rubber or the like) whose rear cylindrical neck (31) surrounds the lock body (14) while the front neck (32) surrounds the sheath (12) as shown in FIG. 1.

The lock body (14) is inserted through a the flap in the rear portion of the motor opening and, in the front portion thereof, near the motor vehicle front venting grid. Inside said lock body (14) the main parts of the lock are provided, as shown in FIG. 1. The lock body (14) surrounds the sheath terminal (16), inside of which the shaft terminal (18) and the ring (15) wherein the spear (17) is fitted are provided.

Figure 13:
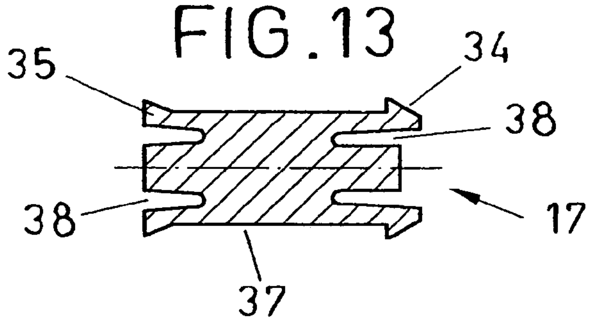
FIG. 13 is a longitudinal cross sectional view of the spear.

Disassembly of the device (10) takes place by rotating the bell of the locking member (20) and releasing the spear (17) from the cable terminal (18). For this purpose, such spear (17) has an appropriate configuration which has been illustrated in FIG. 13. Said configuration consists of a cross-shaped body in cross-section from the ends of which respective spears (34) and (35) emerge and are allowed to be transversely moved as they are spaced apart from the body (37) by a circular recess (38) allowing said spears (34) and (35) to be transversely compressed or expanded, and never released from the lock but the cable terminal (18), according to the circumstances, when rotating the cable (11) and forcing the sheath terminal (16) to be rotated. Torque is transmitted by the sheath to said sheath terminal (16) which reacts backwards, dragging the ring (15) and the latter dragging the terminal (18). As the spear (17) is coupled to the lock, it remains within the lock and the spear (17) and the terminal (18) are thus disconnected.

Figure 9:
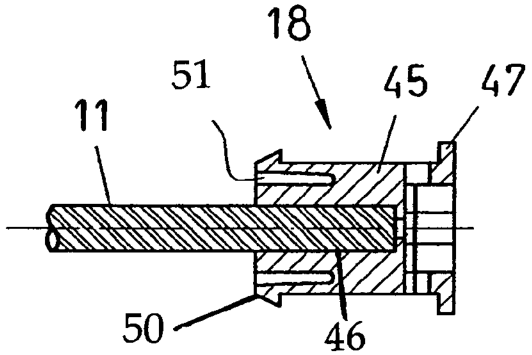
FIG. 9 is a longitudinal cross sectional view of the cable terminal.

As shown in detail in FIGS. 9, 10 and 11, the terminal (18) of the cable (11) wraps and secures the cable (11) and it comprises a cylindrical body (46) provided with holes formed in the side surface thereof (47). Fastening of the terminal (18) in the lock body (14) is achieved by means of a circular extension (48) which, as it can be seen in FIG. 1, is fitted into a cavity (49) in the lock body (14). At the opposed end of said terminal (18) a flap (50) is provided arranged spaced apart from said terminal (18) by a circular recess (51) allowing a certain degree of transverse flexibility of said flap (50) so that the cavity (49) accommodates the ring (15), as shown in FIG. 1.

As it can be seen, the sheath terminal (16) is provided with a side surface having grooves (40) defining peaks (41) and valleys (42) therebetween corresponding to longitudinal recesses (43), said peaks (41) and valleys (42) being fitted into further peaks (44) and valleys (45) provided on the lock body (14), so that rotation on the sheath terminal (16) causes decoupling of the sheath (16) and the lock (14) at the same time the lock is released as the terminal (18) and the spear (17) are disconnected.

Once having been sufficiently described what the present invention consists in accordance to the enclosed drawings, it is understood that any detail modification can be introduced as appropriate, provided that variations may alter the essence of the invention as set forth in the appended claims.

The invention claimed is:

1. Device for Opening the Hood of a Motor Vechicle comprising a latching attached to the motor vehicle bonnet and a lever intended for locking or releasing said latching by rotating or pulling a driving cable (11) joining together a handle and said lever, characterized in that the device (10) is provided, at one of their ends, with a locking member (20) having a cylindrical body (22) surrounding and holding a sheath (12) in place that accommodates and protects said driving cable (11), an opposed end thereof being provided with a lock (14) which body surrounds a sheath terminal (16) of the sheath (12) inside of which a ring (15) is provided for fastening a spear (17), said lock (14) holding said sheath (12) in place helped by a dust-coat (13), so that a rotating action on the locking member (20) causes a releasing action of said lock (14) through said spear (17).

2. "DEVICE FOR OPENING THE HOOD OF A MOTOR VEHICLE" according to claim 1, characterized in that said sheath (12) is provided with a cover (27) inside of which braided wires (28) are arranged and inside of them a metal loop (29) is arranged.

3. "DEVICE FOR OPENING THE HOOD OF A MOTOR VEHICLE" according to claim 1, characterized in that said cylindrical body (22) of the locking member (20) extends into a further frusto conical body (23) which, in turn, extends into a further cylindrical body (24) of greater diameter than the body (22) inside of which a cylindrical hole exists (26) surrounding and trapping said driving cable (11).

4. "DEVICE FOR OPENING THE HOOD OF A MOTOR VEHICLE" according to claim 1, characterized in that a cable terminal (18) wraps and secures said driving cable (11) and it comprises a cylindrical body (46) provided with holes (47) formed in the side surface thereof, said terminal (18) being blocked in the lock body (14) by a circular extension (48) formed on the rear portion of a body (45) that fits into a cavity (49) of the lock body (14), while the opposed end of the terminal (18) is provided with a flap (50) spaced apart by a circular recess (51) allowing a certain degree of transverse flexibility thereof so that said cavity (49) fits into said ring (15).

5. "DEVICE FOR OPENING THE HOOD OF A MOTOR VEHICLE" according to claim 1, characterized in that the lock (14) has a flap (33) adapted to be locked inside the motor opening which is provided therein with the sheath terminal (16) inside of which an inside terminal (18) is provided which, in turn, surrounds the cable (11) and said ring (15) wherein the spear (17) is fitted.

6. "DEVICE FOR OPENING THE HOOD OF A MOTOR VEHICLE" according to claim 5, characterized in that disassembly of the device (10) takes place when rotating a bell of the locking member (20) and releasing the spear (17) of the ring (15), said spear (17) having a slightly cylindrical body from which lower and upper portions respective spears (34, 35) emerge being allowed to be transversely moved as they are spaced apart from the body (37) by a circular recess (38) allowing said spears (34, 35) to be transversely compressed or expended, releasing them from the lock (14) or the ring (15), according to the circumstances, when rotating the cable (11) and forcing the sheath terminal (16) to be rotated so that the inside terminal (18) is never disconnected therefrom.

7. "DEVICE FOR OPENING THE HOOD OF A MOTOR VEHICLE" according to claim 5, characterized in that the sheath terminal (16) is provided with a side surface having grooves (40) defining peaks (41) and valleys (42) therebetween corresponding to longitudinal recesses (43), said peaks (41) and valleys (42) being fitted into further peaks (44) and valleys (45) provided on the lock body (14), so that rotation on the sheath terminal (16) causes decoupling of the sheath (16) and the lock (14) at the same time the lock is released as the inside terminal (18) and the spear (17) are disconnected.

* * * * *